United States Patent [19]

Elstner

[11] 4,063,029

[45] Dec. 13, 1977

[54] ARRANGEMENT FOR EFFECTING A VARIABLE MODIFICATION OF INFORMATION USED TO CONTROL A PRINTER UNIT OF A TELEPRINTER

[75] Inventor: Klaus Elstner, Munich, Germany

[73] Assignee: Siemens Aktiengesellschaft, Berlin & Munich, Germany

[21] Appl. No.: 705,821

[22] Filed: July 16, 1976

[30] Foreign Application Priority Data

Sept. 29, 1975 Germany .............................. 2543468

[51] Int. Cl.$^2$ .......................................... H04L 13/08
[52] U.S. Cl. ................................. 178/17.5; 178/23 R
[58] Field of Search .................. 340/172.5; 178/23 R, 178/17.5, 2 R, 2 B, 3, 4, 26 R, 26 A

[56] References Cited

U.S. PATENT DOCUMENTS

| 3,337,686 | 8/1967 | Grant et al. ........................ 178/23 R |
| 3,697,958 | 10/1972 | Larew ............................... 340/172.5 |

Primary Examiner—Thomas A. Robinson

Attorney, Agent, or Firm—Hill, Gross, Simpson, Van Santen, Steadman, Chiara & Simpson

[57]  ABSTRACT

An arrangement for effecting a variable modification of information used to control a printer unit of a teleprinter has a first store containing information for basic functions required to control the printer unit. A first decoding circuit analyzes received teleprinter characters and drives the first store. A second store contains information required to modify the basic functions. A second decoding circuit analyzes the count reached by a counter and drives the second store. A setting up matrix is sampled by the counter and feeds its output via a multiplexing circuit to a comparator device. The comparator device compares the result of a sampling of the setting up matrix and a read out from the second store with the received teleprinter character, and, if the result is positive, the comparator device causes information contained in the second store to be combined with information from the first store to create a modified information feed to the printer unit.

8 Claims, 3 Drawing Figures

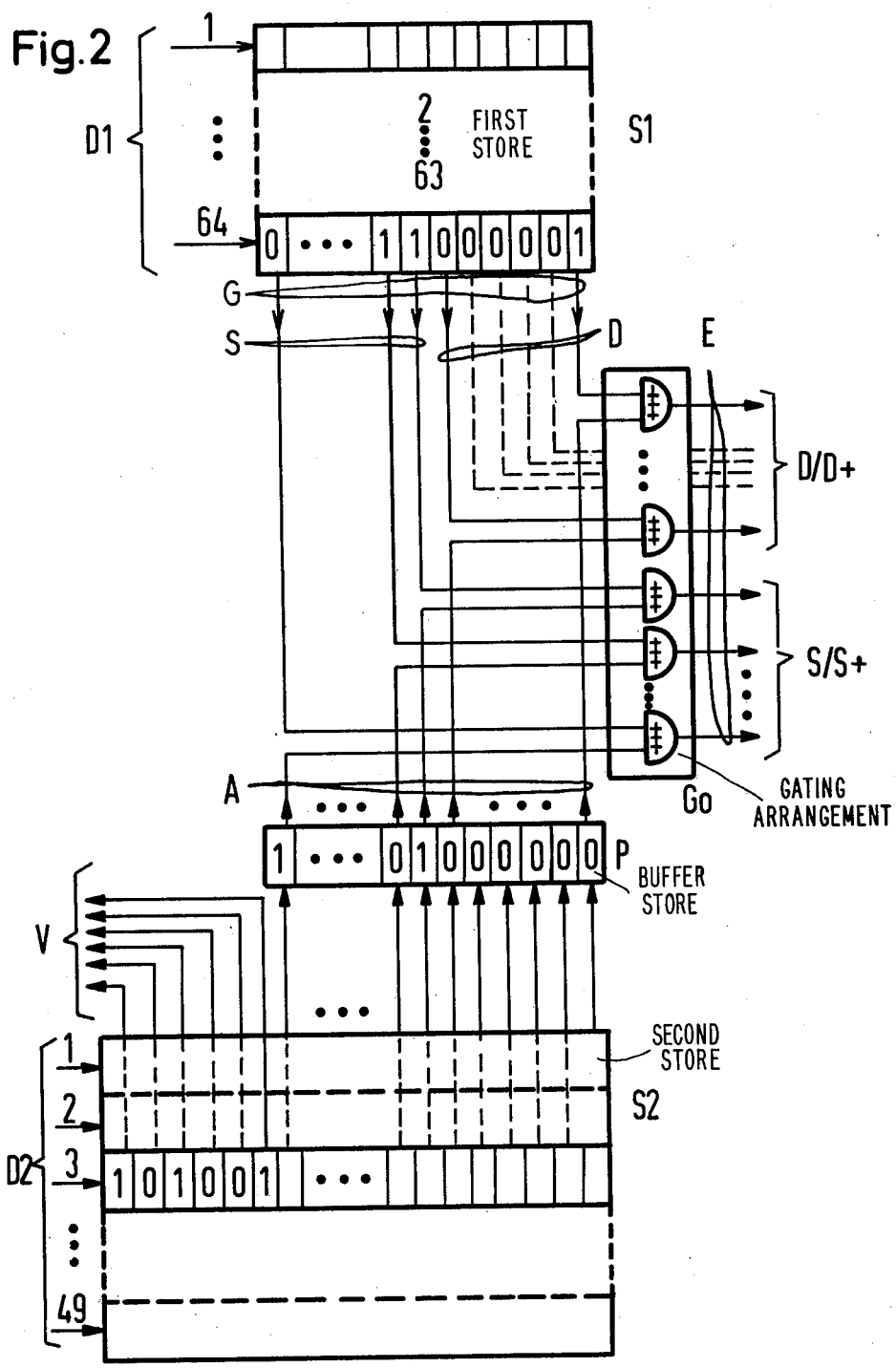

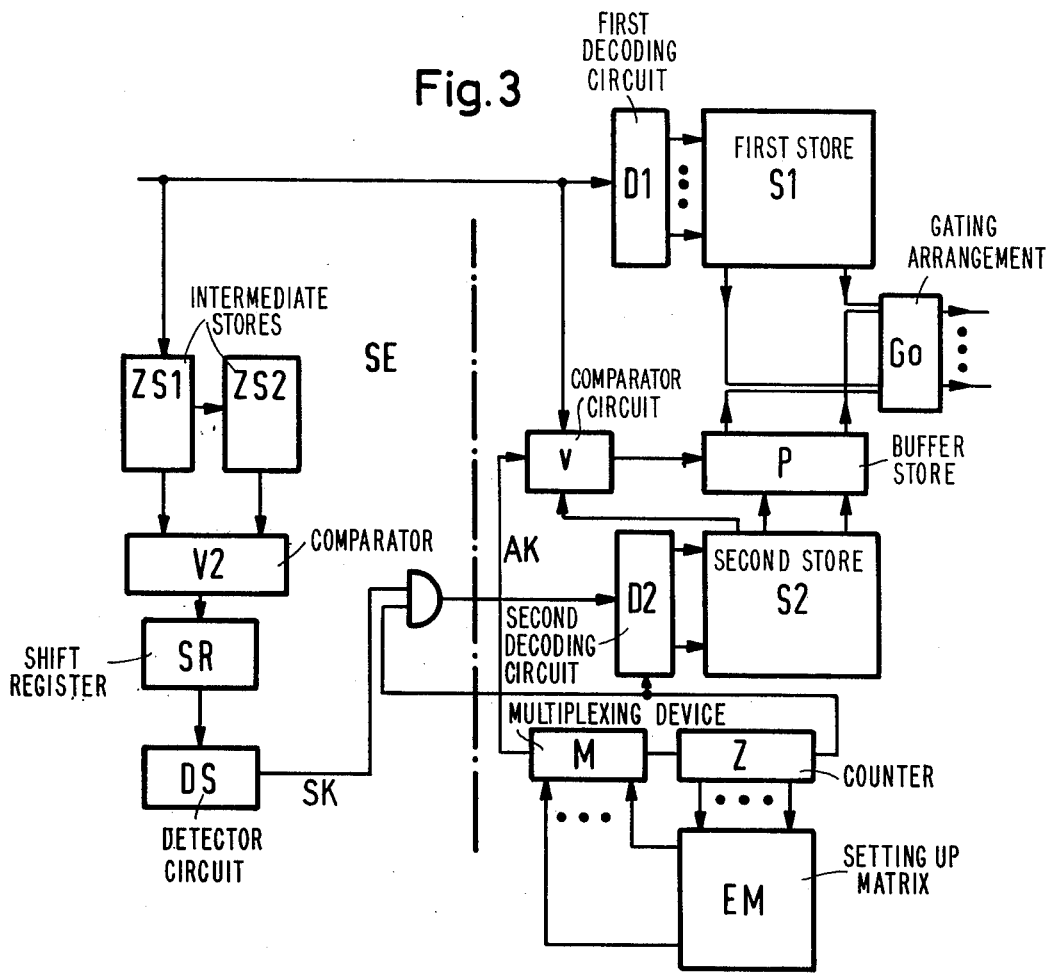

ARRANGEMENT FOR EFFECTING A VARIABLE MODIFICATION OF INFORMATION USED TO CONTROL A PRINTER UNIT OF A TELEPRINTER

BACKGROUND OF THE INVENTION

1. Field of the Invention

The present invention relates to an arrangement for effecting a variable modification in the information used to control the printer unit of a teleprinter having a store. The teleprinter is driven by decoding the received teleprinter characters, the store containing the requisite information for performing the basic functions.

2. Description of the Prior Art

To control the functions of a teleprinter, information required to set up the printer unit together with a series of additional pieces of control information are required. The additional control information triggers the identification generator, the carriage feed or line feed, for example. This information is available at the receiving end in the form of a stock of characters. Individual pieces of information are passed to the printer unit in accordance with a given relationship between the received teleprinter characters and the content of a character store. This is effected by virtue of the fact that in the receiver of a teleprinter, the teleprinter characters arriving serially through the line are converted to parallel bit form and applied to the input of a decoding circuit. Via the latter, a store containing the basic functions of a printer unit in the form of a stock of characters is addressed and from this the code characters produced in order to set up the printer unit. The pieces of control information are produced likewise. Because of the fixed relationship between a received teleprinter character and the information contained in the character store, namely, the information related to the basic function for control of the printer unit, the range of application for a teleprinter is, in each case, restricted to the fundamental design application. Later modification of the relationship is something which can only be carried out at great expense because it involves major intervention into the overall structure of the teleprinter.

SUMMARY OF THE INVENTION

A prime objective of the invention is to provide an arrangement by means of which a modification of the relationship between received teleprinter characters and the information required to control the printer unit can be accomplished in simple fashion. In this context, the invention furthermore seeks to make it possible to effect modifications in these relationships without the need for modifications to internal circuitry or wiring, even after the installation of the teleprinter, so that the latter can be adapted to the most varied kinds of operating situations at any time.

In accordance with the invention, this object is achieved in that besides providing the first store containing the information for the basic functions required to control the printer unit, a second store is provided in which the information required to modify the basic functions is contained. Also, in addition to a first decoding circuit provided to drive the first store and analyze the arriving teleprinter characters, a second decoding circuit is provided to analyze the count reached by a counter and to drive the second store. A setting up matrix which can be sampled via the counter is also provided. Under control of the result from a sampling of the setting up matrix, an address read out of the second store is compared in a comparator device with the arriving teleprinter character, and, if the comparison is positive, the information contained in the second store is relayed to the printer unit. It is preferable in this context to design the setting up matrix as a diode matrix in which each matrix point is assigned to a storage position in the second store. The setting up matrix is fully sampled each time a teleprinter character is received. The sampling occurs via the counter, the selection of the storage positions in the second store being performed via variably distributable diodes in the diode matrix. Thus, via the diode matrix, a selection from among the items of information contained in the second store can be made in order to modify the basic functions. If, as proposed in accordance with the invention, the diode matrix is designed as an external part of the teleprinter, then the arrangement of selection criteria for information in the second store can be effected simply by arranging diodes at corresponding points in the diode matrix.

In the context of the invention, the arrangement provided to modify the relationships can be supplemented by a sequence detection circuit. This circuit advantageously allows one to modify in a simple manner the relationship between a given sequence of teleprinter characters and the control information.

An essential advantage of the arrangement in accordance with the invention resides in the fact that the adjustment of the relationship between individual, specific teleprinter characters and specific pieces of control information, or a modification of the relationship, can be effected independently from the manufacturing process of the teleprinter. Also, the adjustment of the relationship can be performed for the first time on the finished teleprinter after its range of possible applications has been determined.

BRIEF DESCRIPTION OF THE DRAWINGS

FIG. 2 is a block diagram illustrating the modification of a relationship for a selected example;

FIG. 3 is a block diagram illustrating the modification of the relationship between a sequence consisting of several teleprinter characters and the control information for the teleprinter printer unit.

DESCRIPTION OF THE PREFERRED EMBODIMENTS

Figure 1:
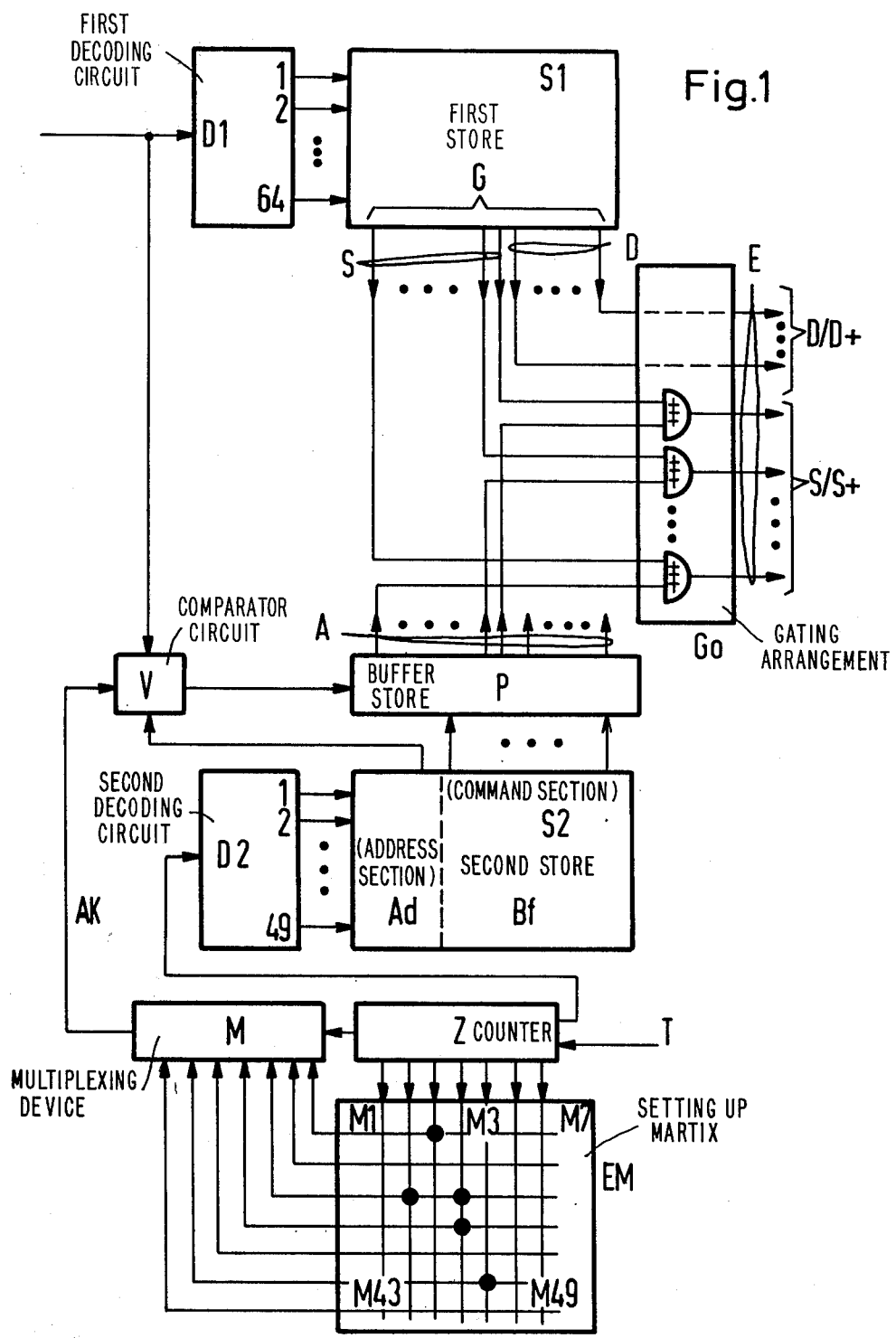
FIG. 1 is a block diagram for explaining in detail the mode of operation of the invention.

In the example of FIG. 1, two stores S1 and S2 are provided, each of which can be addressed via decoding circuits D1 or D2, respectively. In the first decoding circuit D1, the addresses for 64 storage positions in the first store S1, for example, are formed from the received teleprinter characters. This first store S1, designed as a fixed-value store, contains the basic functions G for the control of the printer unit. These in each case comprise a code character D for the setting up of the printer unit and a piece of control information S. The control information S is used, for example, to trigger the operations of printing a character, triggering line feed, triggering a spacing function, etc. In the bottom part of FIG. 1, the circuit sections provided for the modification of the relationships are arranged. Considered in detail, these comprise the second store S2, which can be addressed via the decoding circuit D2, a counter Z, a multiplexing device M, and a setting up matrix EM. Furthermore, this section comprises a comparator circuit V and a buffer store P which can be activated by the comparator device V. To combine the pieces of information from the second store S2 with those from the first store S1, a gating arrangement GO is provided consisting of exclusive-OR gates. Likewise by way of the second store S2, a fixed-value store is used whose 49 storage positions, for example, are each assigned a specific teleprinter character via their addressing section and which in their command section contain the information for the modification of the relationship. Although generally speaking, 49 code words will suffice in the second store, in order to cover all the variations in relationships, the invention is by no means restricted to these particular figures.

In the following, the mode of operation of the arrangement in accordance with the invention will be described in detail.

In this context, it will be assumed that the teleprinter characters arriving in serial bit form are converted to a parallel format comprising six bits on the basis of which, one of the 64 storage positions in the first store S1 is selected via the decoding device D1. At the same time, the received teleprinter character is also available to the comparator device V. At the output of the first store S1, the content of the addressed storage position is made available in the form of a six-bit code word for the printing information D, and in the form of an n-bit code word for the control information S. With each arrival of a teleprinter character, the counter Z is simultaneously activated and advanced under the control of a pulse train T. In this fashion, on the one hand the matrix points M1 to M49 of the setting up matrix EM are sampled and on the other hand, the second store S2 is addressed via the decoding devices D2. Each of the 49 storage positions provided in the second store S2 contains the bit combination corresponding to a specific teleprinter character in the address section Ad. This bit combination is also available to the comparator device V. With the advancing of the counter Z, the multiplexing device M is also advanced, its inputs being connected to the outputs of the setting up matrix. The selection of the addresses 1 to 49 for the storage positions in the second store S2 is performed via the setting up matrix EM for which it is particularly advantageous to use a diode matrix in which diodes are arranged at specific matrix points. Through the cooperation between counter Z and the multiplexing device M, a selecting criterion AK is formed which activates the comparator device V. In the example of FIG. 1, this occurs the first time the counter has reached the count 3. Via a diode provided at the matrix point M3 in the setting up matrix EM and via the multiplexing device M, the selecting criterion AK is formed and passed to the comparator device V after attainment of matrix point M3. At the same time, in correspondence with the count reached by the counter Z, the third storage position in the second store S2 is also addressed via the decoding device D2. Because in the address section of this storage position, the bit combination corresponding to a received teleprinter character has been set up, (a positive result is obtained from the comparison operation) the information contained in the command section Bf of this storage position is passed to the buffer store P.

During further advance by the counter Z, all the other matrix points in the setting up matrix EM are resampled and, in each case, a selection criterion is passed to the comparator device V whenever a diode is located at the particular matrix point scanned. Should the storage positions simultaneously addressed via the second decoding device D2 contain other bit combinations in their address sections, (i.e. should they be assigned to other teleprinter characters) then no further positive result of comparison will appear so that no transfer of information from the second store S2 to the buffer store P will take place. Accordingly, an item of modification information A for the basic function G offered by the first store is available in the buffer store P.

In the gating arrangement GO which consists of a series of exclusive OR-gates, the basic information G offered by the first store and the modification information A offered by the second are combined with one another. This can be performed by arranging in each case for only one bit, or for several bits, to be modified within the control information S or within the control information S and the printing information D. In the example shown in FIG. 1 only a modification to the control information S is shown. Accordingly, at the output of the gating arrangement GO, the information corresponding to the terminal function E is then available. By modifying individual bits in the printing and/or control information of the basic information G a relationship between the received teleprinter character and the information used to control the printer unit for the particular application is achieved.

Making reference to FIG. 2, the procedure of carrying out a modification in relationship is described. The organization of the first and second stores is also explained. As has been described in relation to the example of FIG. 1, with the arrival of a teleprinter character, in the first store S1 a specific storage (in the example of 64 storage positions) is addressed, the counter switched in, and, in accordance with its count, the second store S2 is addressed and the setting up matrix EM sampled with the cooperation of the multiplexing device. It is assumed that the storage position 3 addressed in the second store is assigned to the received teleprinter character of bit combination 101001, which corresponds in the first store S1 to the storage position 64. The presence of a selection criterion and the positive result of comparison in the comparator device leads to the activation of the buffer store P which takes over the information contained in the command section of the storage position 3 in the second store S2. Now, the individual bits of the basic functions G, that is to say the bits belonging to the control information S and those belonging to the printing information D, are in each case available to an input of the exclusive-OR-gates GO forming the gating arrangement. The other inputs of the exclusive-OR gates are connected to the outputs of the buffer store P. It is here assumed that only individual bits within the control information S are to be modified. Therefore, in each case the information transferred to the buffer store P contains a 1 at those places at which the bit in the control information S within the basic function G is to be modified. In the example of FIG. 2, this takes place with respect to the first and last bits of the control information S within the basic function G. Accordingly, at the output of the gating arrangement the printing information D appears in unmodified form whereas the control information is offered to the printer unit in modified form, i.e. S*. The operations described are repeated with each run-through by the counter, the latter being reset after each run-through and being restarted with the arrival of a new teleprinter character.

If the printing information D is also to be modified, then in the gating arrangement GO additional exclusive-OR gates are provided via which the corresponding outputs of the first store S1 are combined with the corresponding outputs of the buffer store.

Another embodiment of the invention has been shown in FIG. 3. The arrangement illustrated there is supplemented, by comparison with that shown in FIG. 1, by a sequence detection circuit SE. This circuit contains two intermediate stores ZS1 and ZS2 in which successive teleprinter characters are stored for purposes of comparison, and a comparator V2. A shift-register SR following the comparator V2 receives the result of comparison with each newly arriving teleprinter character. By decoding the shift-register content in a detector circuit DS, a sequence, that is, a succession of identical teleprinter characters, is detected and a sequence criterion SK formed. If an external setting up facility is required for purposes of modification of the relationship between the teleprinter characters forming a sequence and the control information derived therefrom, then in the above described manner a diode is placed at a specific location in the setting up matrix EM. This matrix point is then assigned a specific count on the part of the counter Z, which, at the same time represents the address of a specific storage position in the second store S2. There, in its address section, the bit combination of the corresponding teleprinter character is set up which is now available to the comparator device V in the described manner, the comparator being activated and producing a positivie result whenever a selection criterion is available via the multiplex device M. In this case, as already described, the information from the command section Bf of the addressed storage position in the second store S2 is transferred to the buffer store P and combined via its outputs with the information offered from the first store S1. The individual bits for control information within the basic information put out by the first store S1, are, in this fashion modified in such a way that the printer unit is supplied with the control information corresponding to a sequence. With this additional arrangement it is accordingly possible without further ado and as required, to analyze as a sequence a series of teleprinter characters not pre-arranged as a sequence.

Although various minor modifications may be suggested by those versed in the art, it should be understood that I wish to embody within the scope of the patent warranted hereon, all such embodiments as reasonably and properly come within the scope of my contribution of the art.

I claim as my invention:

1. An arrangement for effecting a variable modification in information used to control a printer unit of a teleprinter, comprising:
   a. a first store for controlling the printer unit, said store containing information for basic functions required to control the printer unit;
   b. a first decoding circuit for analyzing received teleprinter characters and for driving the first store;
   c. a second store containing information required to modify the basic functions;
   d. a counter;
   e. a second decoding circuit for analyzing the count reached by the counter and for driving the second store;
   f. a setting up matrix scanned via the counter;
   g. a multiplexing circuit connected with the counter and the setting up matrix in which a selection criterion is formed by means of a result from scanning the setting up matrix; and
   h. a comparator device in which the selection criterion resulting from the scanning of the setting up matrix and an address read out from the second store are compared with a received teleprinter character, and, if the results are positive, the information contained in the second store being relayed to the printer unit.

2. An arrangement as claimed in claim 1, characterized in that the setting up matrix is designed as a diode matrix in which each intersection point is assigned a storage position in the second store, the setting up matrix being completely sampled via the counter each time a teleprinter character is received, selection of the storage positions in the second store being performed by variable distribution of diodes in the setting up matrix.

3. An arrangement as claimed in claim 1, characterized in that storage positions having command and address sections in the second store are in each case assigned to a specific teleprinter character via their address sections, and in their command sections contain the information required to modify the information of the basic function assigned to the specific teleprinter character in the first store.

4. An arrangement as claimed in claim 1, characterized in that the outputs of address sections of the second store are connected to the comparator device and the outputs of command sections of the second store are connected to a buffer store which can be controlled by the comparator device, the command information for the second store being transferred into the buffer store in the presence of a selection criterion and in the event of a positive comparison between the address read out of the second store and the received teleprinter character, and a gating arrangement connected between the outputs of the first store and the outputs of the buffer store for analyzing information from the first and second stores.

5. An arrangement as claimed in claim 4 characterized in that the gating arrangement contains in respect of each bit of the information within the basic function intended for modification an exclusive-OR gate whose inputs are in each case connected to the corresponding outputs of the first store and the buffer store.

6. An arrangement as claimed in claim 1 characterized in that the second decoding device is connected to a sequence detection circuit for the comparison of at least two successive teleprinter characters to form a sequence criterion, addressing of the second store being performed by analyzing the sequence criterion and the count reached by the counter sampling the setting up matrix and in the event of a selection criterion being produced and with a positive comparison between the teleprinter characters respectively read out from address sections of the second store and forming the sequence, command information being transferred from the second store to a buffer store and passing via a gating arrangement to the printer unit.

7. An arrangement as claimed in claim 6, characterized in that the sequence detection circuit comprises two intermediate stores to receive successive teleprinter characters, a comparator circuit for comparing the intermediately stored teleprinter characters, a shift-register for receiving the result of comparison, and a detector circuit for analyzing the content of the shift-register and generating the sequence criterion.

8. An arrangement for variable modification of information used to control a printer unit of a teleprinter, comprising:
   a. a first storage means for containing information for basic functions to control the printer unit;
   b. a first decoding means connected to the first storage means for analyzing received teleprinter characters;
   c. a second storage means for containing information to modify the basic functions;
   d. a counter;
   e. a second decoding means connected to the counter and second storage means;
   f. a multiplexing means;
   g. a setting up matrix connected to the counter and multiplexing means;
   h. a comparator means having inputs connected to said multiplexing means, second storage means, and received teleprinter characters, an output of said comparator effecting a transfer of the information out of the second storage means; and
   i. combining means connected to said first and second storage means for controlling the printer unit with modified information.

* * * * *